(12) United States Patent
Kaplan (10) Patent No.: US 10,205,758 B2
(45) Date of Patent: *Feb. 12, 2019

(54) AUTOMATIC SHARING OF DIGITAL MULTIMEDIA

(71) Applicant: Dropbox, Inc., San Francisco, CA (US)

(72) Inventor: Joshua Kaplan, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,089

(22) Filed: Apr. 25, 2016

(65) Prior Publication Data

US 2016/0241608 A1 Aug. 18, 2016

Related U.S. Application Data

(63) Continuation of application No. 14/107,108, filed on Dec. 16, 2013, now Pat. No. 9,350,774.

(51) Int. Cl.
| G06F 15/16 | (2006.01) |
| H04L 29/06 | (2006.01) |
| H04L 12/58 | (2006.01) |
| H04L 29/08 | (2006.01) |
| G06Q 10/10 | (2012.01) |

(52) U.S. Cl.
CPC ..... H04L 65/1093 (2013.01); G06Q 10/1095 (2013.01); H04L 51/10 (2013.01); H04L 65/403 (2013.01); H04L 67/325 (2013.01)

(58) Field of Classification Search
CPC .. H04L 65/1093; H04L 51/10; G06Q 10/1095
USPC ......................................................... 709/206
See application file for complete search history.

(56) References Cited

U.S. PATENT DOCUMENTS

| 6,317,777 B1 * | 11/2001 | Skarbo ............. G06F 17/30887 |
| | | 348/E7.083 |
| 8,943,140 B1 * | 1/2015 | Kothari ................. H04L 65/403 |
| | | 709/203 |
| 2003/0172120 A1 * | 9/2003 | Tomkow ............... G06Q 10/107 |
| | | 709/206 |

(Continued)

FOREIGN PATENT DOCUMENTS

EP 2261778 B1 2/2012

OTHER PUBLICATIONS

Using Adobe Connect 9, last updated Mar. 30, 2015, 269 pages.

(Continued)

*Primary Examiner* — Vivek Srivastava
*Assistant Examiner* — Atta Khan
(74) *Attorney, Agent, or Firm* — Hickman Palermo Becker Bingham LLP (57) ABSTRACT

Devices and methods for automatic sharing of digital multimedia include, in one embodiment, obtaining factor data affecting a decision on whether or not to enter a digital multimedia sharing mode for an event or meeting; entering the digital multimedia sharing based on the factor data; storing digital photograph data produced by a camera module while in the sharing mode and automatically making the digital photograph data available to one or more participants of the event or meeting via a synchronized data container or a shareable link of an online content management system.

19 Claims, 3 Drawing Sheets

(56) References Cited

U.S. PATENT DOCUMENTS

| | | |
|---|---|---|
| 2005/0083406 A1 | 4/2005 | Cozier |
| 2007/0112926 A1 | 5/2007 | Brett |
| 2009/0019367 A1 | 1/2009 | Cavagnari |
| 2009/0119246 A1* | 5/2009 | Kansal ............... G06F 17/30038 |
| 2009/0172120 A1* | 7/2009 | Ruelas ................ H04L 12/1818 709/206 |
| 2010/0235216 A1* | 9/2010 | Hehmeyer ....... G06Q 10/06316 705/7.26 |
| 2010/0306018 A1 | 12/2010 | Burtner et al. |
| 2011/0231778 A1* | 9/2011 | Hoag ................ G06F 17/30867 715/745 |
| 2012/0124079 A1 | 5/2012 | Kinsella |
| 2012/0254785 A1 | 10/2012 | Nakajo |
| 2013/0013683 A1* | 1/2013 | Elliott .................. G06Q 10/101 709/204 |
| 2013/0091440 A1* | 4/2013 | Kotler .................... G06Q 10/10 715/753 |
| 2013/0212067 A1* | 8/2013 | Piasecki ............ G06F 17/30176 707/620 |

OTHER PUBLICATIONS

Smith, Michael A., ""Mobile Image Capture and Management"" 2004 Joint ACM/IEEE Conference on Digital Libraries (p. 417).

U.S. Appl. No. 14/107,108, filed Dec. 16, 2013, Final Office Action, dated Aug. 12, 2015.

U.S. Appl. No. 14/107,108, filed Dec. 16, 2013, Office Action, dated Feb. 9, 2015.

U.S. Appl. No. 14/107,108, filed Dec. 16, 2013, Notice of Allowance, dated Jan. 20, 2016.

U.S. Appl. No. 14/107,108, filed Dec. 16, 2013, Advisory Action, dated Nov. 19, 2015.

U.S. Appl. No. 14/107,108, filed Dec. 16, 2013, Interview Summary, dated Oct. 21, 2015.

* cited by examiner

AUTOMATIC SHARING OF DIGITAL MULTIMEDIA

BENEFIT CLAIM

This application claims the benefit under 35 USC § 120 as a continuation of application Ser. No. 14/107,108, filed Dec. 16, 2013, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

TECHNICAL FIELD

The present invention relates generally to camera-equipped computing devices and more particularly to a system and method for automatic sharing of digital multimedia such as digital photograph data and digital video data captured using a camera-equipped computing device.

BACKGROUND

People often take digital photographs and digital videos of events they attend. For example, many people use their camera-equipped computing devices (e.g., camera-equipped mobile phones) to capture photographs of meetings they participate in, sporting events they are fans at, weddings they are invited to, and other events they attend. Events at which digital photographs or digital videos are captured are often recorded (calendared) in a digital calendaring application or other event tracking computer application. For example, a person may use a calendaring application on their personal computing device for tracking the dates, times and locations of business meetings they are scheduled to attend.

In many cases, people who capture photographs at an event want to share the captured photographs with other people who also attend the event. For example, a participant in a meeting that takes digital photographs of the meeting room whiteboard at various times during the meeting may want to share the photographs of the whiteboard with the other participants at the meeting.

One possible approach for sharing digital photographs captured at an event is for the photographer to send them to the other event attendees as attachments to electronic mail messages or as attachments to text messages. This approach typically requires the photographer to send each photo as an attachment immediately after it is captured and before a next photo is captured or requires the photographer to examine all digital photographs captured during a period of time to identify particular photographs to share. For example, an employee that wishes to share photographs captured of a whiteboard during a meeting that took place last week may have to sift through all photographs captured in the interim including possibly personal or other unrelated photographs to identify the photographs taken during the meeting. This approach can be a cumbersome and inefficient way to share digital photographs because it requires the photographer to remember to share each digital photo immediately after it is captured or requires the photographer to individually identify photographs to share from among a collection of photographs which may include other photographs the photographer does not want to share such as personal photographs or photographs captured before, after, or unrelated to the event. More generally, this approach requires the photographer to manually share the captured photographs in a way that the photographer may find inconvenient and tedious.

Therefore, users of digital photo capturing devices such as camera-equipped mobile phones or other camera-equipped computing devices would appreciate ways to more easily share digital photographs captured at events with other event attendees.

BRIEF DESCRIPTION OF THE DRAWINGS

Implementations of the present technology will now be described by way of example with reference to the attached figures, wherein.

DETAILED DESCRIPTION

Introduction

For purpose of providing clear examples, where appropriate, reference numerals are repeated in different figures to indicate corresponding or analogous elements. In addition, in the following detailed description, embodiments of the invention are described with reference to numerous specific details that may vary from implementation to implementation. The detailed description and the figures are, accordingly, to be regarded in an illustrative rather than a restrictive sense. Also, in the following detailed description, for the purposes of explanation, numerous specific details are set forth in order to provide a thorough understanding of the present technology. It will be apparent, however, that the present technology may be practiced without these specific details. In other instances, well-known structures and devices are shown in in the figures in block diagram form in order to avoid unnecessarily obscuring the present technology.

Glossary

The following definitions are offered for purposes of illustration, not limitation, in order to assist with understanding the discussion that follow.

The terms "3GP" and "3GPP" refer to a digital multimedia container format defined by the Third Generation Partnership Project (3GPP) for 3G Universal Mobile Telecommunications System (UMTS) multimedia services.

The term "and/or" refers to and encompasses any and all possible combinations of one or more of the associated listed items.

The terms "event" and "meeting" refer to a calendar event or calendar meeting involving one or more participants, respectively.

The terms "event location" and "meeting location" refer to the physical location of an event or meeting, respectively, such as a conference room, other room, physical address, city, campus, campus sub-region, building, floor, and/or building sub-region.

The term "digital image" refers to computer data that represents a two-dimensional image captured by a digital camera. The computer data is typically in either a lossy digital image data format (e.g., JPEG) or a lossless format (e.g., TIFF or RAW).

The term "digital photograph data" refers to computer data that represents one or more digital images captured using an optical sensor and a camera module. A single digital image is referred to herein as a "digital photograph" or just "photograph."

The term "digital video data" refers to computer data that represents a series of two-dimensional digital images (frames or video frames) to be presented in rapid succession to create the appearance of motion. The video frames may be captured using an optical sensor and a camera module. The digital video data can also include digital audio data that represents audio to be presented as an audible accompaniment to the visual presentation of the video frames. The digital audio data may be captured using a microphone and associated audio circuitry. The computer data is typically formatted according to audio and visual encoding format such as MPEG-4 or 3PG, as examples.

The term "JPEG" stands for Joint Photographic Experts Group and is an industry standard developed to handle color digital images. JPEG is known as a "lossy" format as it compresses images by blending redundant image pixels to reduce the number of bits required to represent the images in a computer at the expense of image quality.

The term "MPEG-4" refers to a method of defining compression of audio and visual (AV) digital data. MPEG-4 is designated a standard for a group of audio and video coding formats and related technology agreed upon by the ISO/IEC Moving Picture Experts Group (MPEG) (ISO/IEC JTC1/SC29/WG11) under the formal standard ISO/IEC 14496-*Coding of audio-visual objects*.

The terms "event participant" and "meeting participant," and "participant" when being used to refer to an event participant or a meeting participant, refer to a person who is an organizer or an invitee of a calendar event or calendar meeting, respectively. A participant in an event or meeting may or may not be an attendee at the event or meeting. For example, a participant who is an invited to a meeting but declined the meeting invitation may not be an attendee.

The term "RAW" refers to a proprietary "lossless" digital image format that allows for full post-processing of in-camera variables such as white balance, saturation, and sharpness. Digital images in RAW format generally require more computer storage space than digital images in a lossy format such as JPEG.

The terms "TIFF" and "TIF" stand for Tag Image File Format. TIFF is a lossless digital image format that results in very large digital image sizes when stored in a computer. Digital images in TIFF format are often compressed using a lossless compression technique such as LZW, a lossless data compression algorithm created by Abraham Lempel, Jacob Ziv, and Terry Welch.

Overview of Automatic Sharing of Digital Multimedia

Typically, when digital photographs are captured using a camera-equipped computing device, the captured photographs are stored in a default photograph repository at the computing device where all captured photographs are stored by default. For example, the default repository may be a designated file system folder. Often, each of the captured photographs is stored in the default repository as a file with a filename that indicates the capture date and time of the photograph. For example, the default repository may store files named IMG0007.jpg or DSC0123.jpg.

Unfortunately, use of a default repository for storing captured photographs can make it inconvenient for the user of the computing device to share particular captured photographs. More specifically, if the user wants to share photographs captured during a particular period of time, the user is required to examine captured photographs stored in the default repository to identify and select photographs to share. Since the default repository may comingle photographs the user wishes to share with ones the user does not want so share, such identification and selection can be tedious and time consuming to the user. Further, once the user has identified and selected photographs in the default repository to share, the user is still required to perform manual steps to share the identified photographs with other persons. Typically, these manual steps require the user (a) to provide user input to the computing device to invoke a function to send the selected photographs as attachments to electronic messages and (b) to provide additional user input to enter the addresses or identifiers of the recipients or to otherwise select the recipients to receive the electronic messages. In a worst case, the user is required to repeat manual steps (a) and (b) for each selected photograph to share.

The present technology solves the tedium and inconvenience associated with current approaches for sharing captured digital multimedia by providing a system and method for automatic sharing of digital multimedia such as digital photographs and digital videos captured by a computing device equipped with a camera module. The present technology can include obtaining factor data affecting a decision on whether or not to enter a digital multimedia sharing mode for an event or meeting. The event or meeting can involve one or more participants. A digital multimedia sharing mode can be entered based on determining calendar entry data stored in a calendar database that satisfies the obtained factor data. The calendar entry data can represent the event or meeting involving the one or more participants. Digital photograph data produced by the camera module while in the digital multimedia sharing module can be stored in a digital multimedia container designated to store digital multimedia for the event or meeting. Participant data for the event or meeting can be obtained from the calendar entry data. The obtained participant data can indicate the one or more participants. The identified photograph data obtained can be automatically made available to the one or more participants based on the obtained participant data.

Because the digital photograph data is stored in a digital multimedia container designated to store digital multimedia for the event or meeting, digital photograph data for the event or meeting can be stored separately from other digital multimedia data produced by the camera module, such as digital multimedia data produced by the camera module when not in the digital multimedia sharing mode. Further, because the digital multimedia sharing mode is entered, the digital photograph data produced by the camera module while in the digital multimedia sharing mode can be automatically identified as pertaining to the event or meeting and automatically processed accordingly. For example, digital photograph data identified as pertaining to a particular meeting can be automatically sent to participants associated with the meeting.

In this detailed description, for purposes of provided clear examples, the present technology is described in the context of digital photographs and digital photograph data captured and produced by a camera module. It should be understood, however, the present technology is not limited to providing automatic sharing of only digital photograph data and may be applied according to the general principles and techniques of the present technology described herein to provide automatic sharing of other types of digital multimedia data including digital photograph data, digital video data, digital audio data, and a combinations of digital photograph data, digital video data, and digital audio data.

Exemplary Camera-Equipped Computing Device

Figure 1:
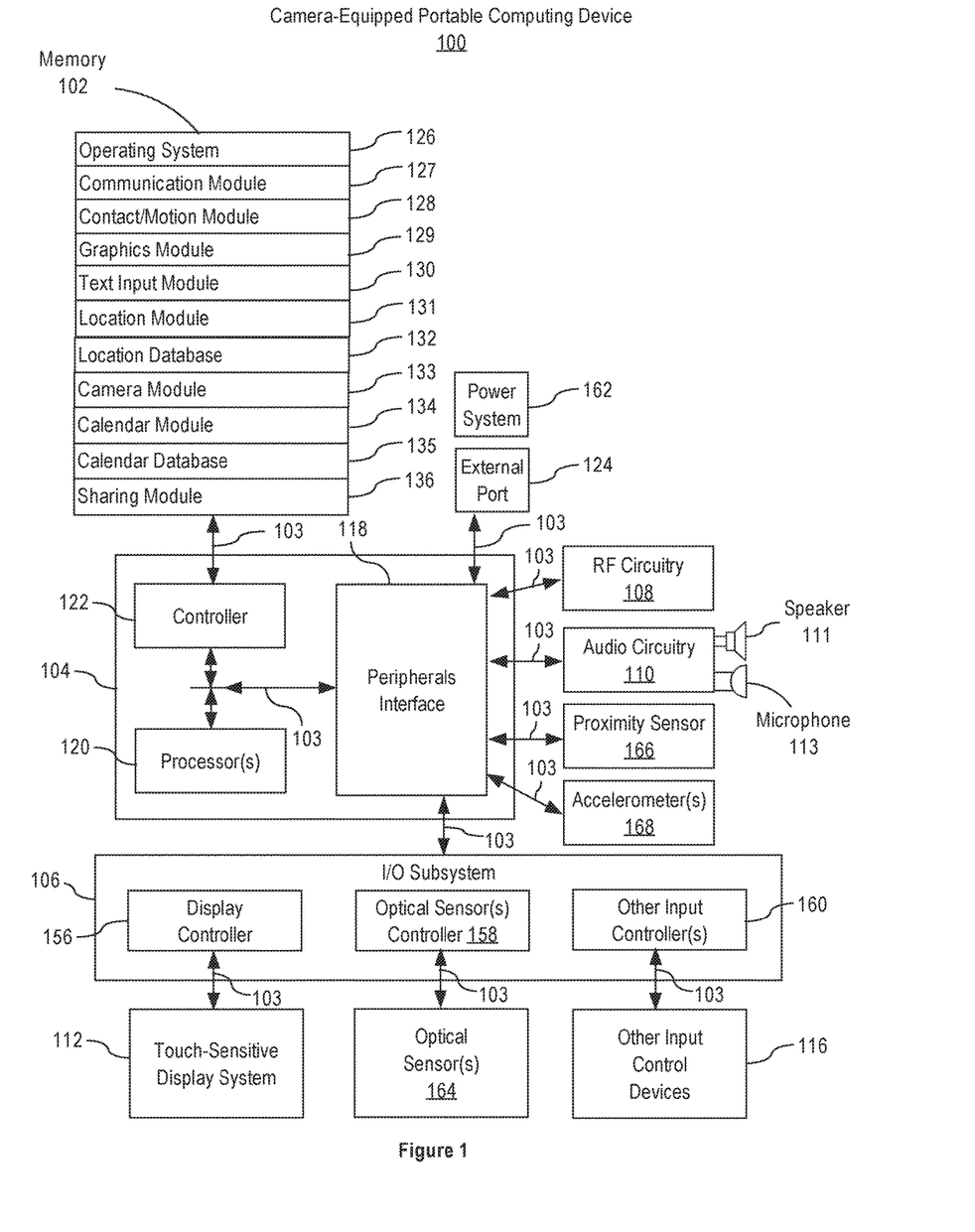
FIG. 1 is a block diagram of an example of a camera-equipped computing device in which the present technology may be embodied.

FIG. 1 is a block diagram of an exemplary camera-equipped portable computing device 100 in which the present technology may be embodied. Device 100 may correspond to one of a number of different types of camera-equipped computing devices including, but not limited to, a cellular phone, a smartphone, an electronic camera, a netbook, a laptop computer, a global position system (GPS) device, an electronic tablet, an electronic pad, a personal digital assistant (PDA), or any other electronic device having or operatively coupled to a camera module.

While device 100 is a portable or human carry-able, there is no requirement that the present technology be embodied in a portable computing device. The present technology can also be embodied in non-portable computing devices such as a desktop computer, a workstation computer, or other stationary computing device. More generally, it should be appreciated that device 100 is only one example of a camera-equipped computing device 100, and a camera-equipped computing device in which the present technology is embodied may have more or fewer components or a different arrangement of components than as shown for device 100 in FIG. 1. The various components shown in FIG. 1 may be implemented in hardware, software, or a combination of both hardware and software, including one or more signal processing and/or application specific integrated circuits (ASICs). The components may communicate over one or more communication buses or signal lines 103.

Further, while the present technology may be embodied in a camera-equipped computing device, the present technology may also be embodied in a computing device that is not equipped or operatively coupled to a camera or other optical sensing device. For example, the present technology may be embodied in a smart whiteboard device having a touch-sensitive display and that can output or otherwise produce digital photograph data of what is written and/or sketched on the smart whiteboard.

Device 100 includes one or more optical sensors 164. FIG. 1 shows an optical sensor coupled to an optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with a camera module 133, optical sensor 164 may capture still images or video. In some embodiments, an optical sensor is located on the back of device 100, opposite touch screen 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Memory 102 can include high-speed random access memory and can also include non-volatile memory, such as one or more magnetic disk storage devices, flash memory devices, or other non-volatile solid-state memory devices. Access to memory 102 by other components of device 100, such as CPU 120 and peripherals interface 118, can be controlled by memory controller 122.

Peripherals interface 118 couples the input and output peripherals of device 100 to CPU 120 and memory 102. One or more processors (CPUs) 120 run or execute various software programs and/or sets of instructions stored in memory 102 to perform various functions for device 100 and to process data. In some embodiments, peripherals interface 118, CPU 120, and memory controller 122 are implemented on a single chip, such as chip 104. In other embodiments, peripherals interface 118, CPU 120, and memory controller 112 are implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), WiMAX, a protocol for email, instant messaging, and/or Short Message Service (SMS)), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (not shown). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as a touch-sensitive display 112 and other input/control devices 116, to peripherals interface 118. I/O subsystem 106 may include display controller 156 and one or more input controllers 160 for other input or control devices 116. One or more input controllers 160 receive/send electrical signals from/to other input or control devices 116. Other input/control devices 116 may include physical buttons (e.g., push buttons, rocker buttons, etc.), dials, slider switches, joysticks, click wheels, and so forth. In some embodiments, input controller(s) 160 are coupled to any (or none) of the following: a keyboard, infrared port, USB port, and a pointer device such as a mouse. One or more buttons may include an up/down button for volume control of speaker 111 and/or microphone 113. One or more buttons may include a push button. A quick press of the push button may disengage a lock of touch screen 112 or begin a process that uses gestures on the touch screen to unlock the device. A longer press of push button may turn power to device 100 on or off. The user may be able to customize a functionality of one or more of the buttons. Touch screen 112 is used to implement virtual or soft buttons and one or more soft keyboards.

Touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

Touch screen 112 has a touch-sensitive surface, sensor, or set of sensors that accept input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on the touch screen. In an exemplary embodiment, a point of contact between touch screen 112 and the user corresponds to a finger of the user.

Touch screen 112 may use LCD (liquid crystal display) technology, or LPD (light emitting polymer display) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. The user may make contact with touch screen 112 using any suitable object or appendage, such as a stylus, a finger, and so forth. In some embodiments, a user interface displayed on touch screen 112 is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user. In some embodiments, in addition to or instead of touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes a power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more proximity sensors 166. FIG. 1 shows proximity sensor 166 coupled to peripherals interface 118. Alternately, proximity sensor 166 may be coupled to input controller 160 in I/O subsystem 106. In some embodiments, proximity sensor 166 turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

Device 100 may also include one or more accelerometers 168. FIG. 1 shows an accelerometer 168 coupled to peripherals interface 118. Alternately, the accelerometer 168 may be coupled to input controller 160 in the I/O subsystem 106. In some embodiments, information is displayed on touch screen display 112 in a portrait view or a landscape view based on an analysis of data received from one or more accelerometers 168.

In some embodiments, the software components stored in memory 102 may include an operating system 126, a communication module (or set of instructions) 127, a contact/motion module (or set of instructions) 128, a graphics module (or set of instructions) 129, a text input module (or set of instructions) 130, a location module (or set of instructions) 131, a location database 132, a camera module (or set of instructions) 133, a calendar module (or set of instructions) 134, a calendar database (or set of instructions) 135, and a digital multimedia sharing module (or set of instructions) 136.

The operating system 126 (e.g., APPLE IOS, WINDOWS PHONE, ANDROID, PALM WEBOS, SYMBIAN, WINDOWS MOBILE, BLACKBERRY OS, or other operating system) includes various software components and/or drivers for controlling and managing general system tasks (e.g., memory management, storage device control, power management, etc.) and facilitates communication between various hardware and software components.

Communication module 127 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.).

Contact/motion module 128 may detect contact with touch screen 112 (in conjunction with display controller 156) and other touch sensitive devices (e.g., a touchpad or click wheel). Contact/motion module 128 includes various software components for performing various operations related to detection of contact, such as determining if contact has occurred, determining if there is movement of the contact and tracking the movement across touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 128 and display controller 156 also detects contact on a touchpad. In some embodiments, contact/motion module 128 and controller 160 detects contact on a click wheel.

Graphics module 129 includes various known software components for rendering and displaying graphics on touch screen 112, including components for changing the intensity of graphics that are displayed. As used herein, the term "graphics" includes any object that can be displayed to a user, including without limitation text, web pages, icons (such as user-interface objects including soft keys), digital images, videos, animations, and the like.

Text input module 130, which may be a component of graphics module 129, provides soft keyboards for entering text in various applications (e.g., a contacts list application, an e-mail application, an instant messaging application, a blogging application, a web browser application, and any other application that needs text input).

Location module 131 determines the location of the device and provides this information for use in various applications (e.g., to camera module 133 as picture/video metadata). For example, location module 131 can be a geographical positioning system (GPS) that receives signals from Earth-orbiting satellites to determine current geographic position of device 100. Alternatively, location module 131 can be a positioning system that communicates with a network communications system or any other system for determining the physical location or position of device 100.

Location database 132 may also be stored in memory 102. Location database 132 can associate location information with geographic coordinates. Geographic coordinates obtained from location module 131 can be used as lookup keys to the location database to obtain location information associated with the geographic coordinates. The location information may include, but is not limited to, maps or addresses or any other information useful to associate with geographic coordinates. Lookups in location database 132 may not require an exact match between geographic coordinates provided as a key and geographical coordinates in location database 132 associated with location information. Instead, it may be possible to obtain location information for given coordinates from location database 132 by determining the geographic coordinates or set of coordinates in location database 132 that are geographically near or nearest the given coordinates.

Camera module 133 may be used to capture still digital images or video (including a digital video stream) and store them in memory 102. The location in memory 102 where captured digital photograph data and digital video data is stored by camera module 133 may be controlled by sharing module 135 through an application programming interface (API) or other messaging interface offered by camera module 133 and/or operating system 126.

Calendar module 134 can include functionality providing typical calendaring functionality such as storing event/meeting information, presenting event/meeting information, sending, and/or receiving event/meeting invitations, accepting and/or declining event/meeting invitations, and/or sending notification of acceptance/declination.

Calendar database 135, which may be accessed by calendar module 134 and perhaps by other modules, such as sharing module 136, through an application programming interface, stores information (e.g., metadata) concerning various types of calendars as well as data (e.g., event data, also called meeting data, event entry data, calendar data, calendar entry data, calendar event data, or calendar meeting data) for various calendars. An event entry in calendar database 135 includes information for an event, sometimes called a meeting, a calendar event, or a calendar meeting. Among other data, an event entry may include some of or all of the following data for a calendar meeting/event:

- an entry identifier (Entry ID) that uniquely identifies the entry;
- a requester identifier (Requester ID) that identifies the requester (or an event/meeting organizer) associated with the event entry;
- owner identifiers (Owner ID(s)) that identify owners of the entry and therefore can make changes to it, the set of owners may include the requester and one or more of the invitees;
- invitee identifiers (Invitee ID(s)) that identify the invitee(s) (optionally, including or excluding the requester) associated with the calendar entry and optionally, other data identifying required invitee(s) and/or optional invitee(s);
- a start date and time of the event (sometimes called a timestamp), the timestamp may be accompanied by time zone information; in some embodiments, the timestamp indicates a number of milliseconds since an epoch (e.g., Jan. 1, 1970) and a time zone, in some embodiments, when determining a calendar day, month, and year of a timestamp, the determination is made based on a known reference calendar such as, for example, a Gregorian calendar;
- an end date and time of the event (sometimes called a timestamp) or, alternatively, an event duration (which, in combination with the start date and time, provides sufficient information to identify the end date and time of the event);
- a location (e.g., building, campus, city, address, etc.) of the event;
- recurrence rules, if any, for the event (e.g., whether the meeting occurs once daily, weekly, every other week, monthly, yearly, etc., and the number of occurrences or an end data for terminating the series of events);
- an event description (e.g., title, description details, etc.); and/or
- user actions, if any, with respect to the event, such as: information indicating which invitees of an event accepted, declined, or tentatively accepted an invention to the event and/or which participants are attending or not attending the event (if such information is available).

In some embodiments, a separate calendar database 135 is maintained for each of multiple users of device 100, while in other embodiments, calendar database 135 records events for multiple users.

Operating system 126, calendar module 134, and/or calendar database 135 can provide access to a users' calendar entries stored in calendar database 135 to another module such as sharing module 136. Such access can be provided through an application programming interface (API) that allows other modules (e.g., sharing module 136) to query calendar database 135 and/or receive notification of calendar events. The API may allow other modules to retrieve (query) a user's existing calendar entries, adding (setting) alarms to alert the other modules of upcoming events, receive alerts (alarms) for upcoming events, and detect changes to calendar database 135.

Digital multimedia sharing module 136 can be operable, upon execution by CPU 120: to obtain factor data affecting a decision on whether or not to enter a digital multimedia sharing mode for an event or meeting; to enter a digital multimedia sharing mode based on identifying calendar entry data for the event or meeting stored in calendar database 135 that satisfies the factor data; to store digital photograph data produced by camera module 133 while in the digital multimedia sharing mode in a digital multimedia container designated to store digital multimedia for the event or meeting; to obtain participant data for the event or meeting from the calendar entry data; and to automatically make the obtained digital photograph data available to one or more participants of the event or meeting based on the obtained participant data.

Each of the above-identified modules and applications correspond to a set of instructions for performing one or more functions described above. The modules (i.e., sets of instructions) need not be implemented as separate software programs, procedures, or modules, and thus various subsets of these modules may be combined or otherwise re-arranged in various embodiments. For example, camera module 133, calendar module 134, and sharing module 136 may be combined into a single module. In some embodiments, memory 102 stores a subset of the modules and data structure identified above. Further, memory 102 may store additional modules and data structures not described above. In some embodiments, some or all of a module is implemented by operating system 126. For example, some or all of the functionality described above as provided by communication module 127, contact/motion module 128, graphics module 129, text input module 130, location module 131, camera module 133, and/or calendar module 134 may instead be provided by operating system 126.

Exemplary Process for Automatic Sharing of Digital Multimedia

Figure 2:
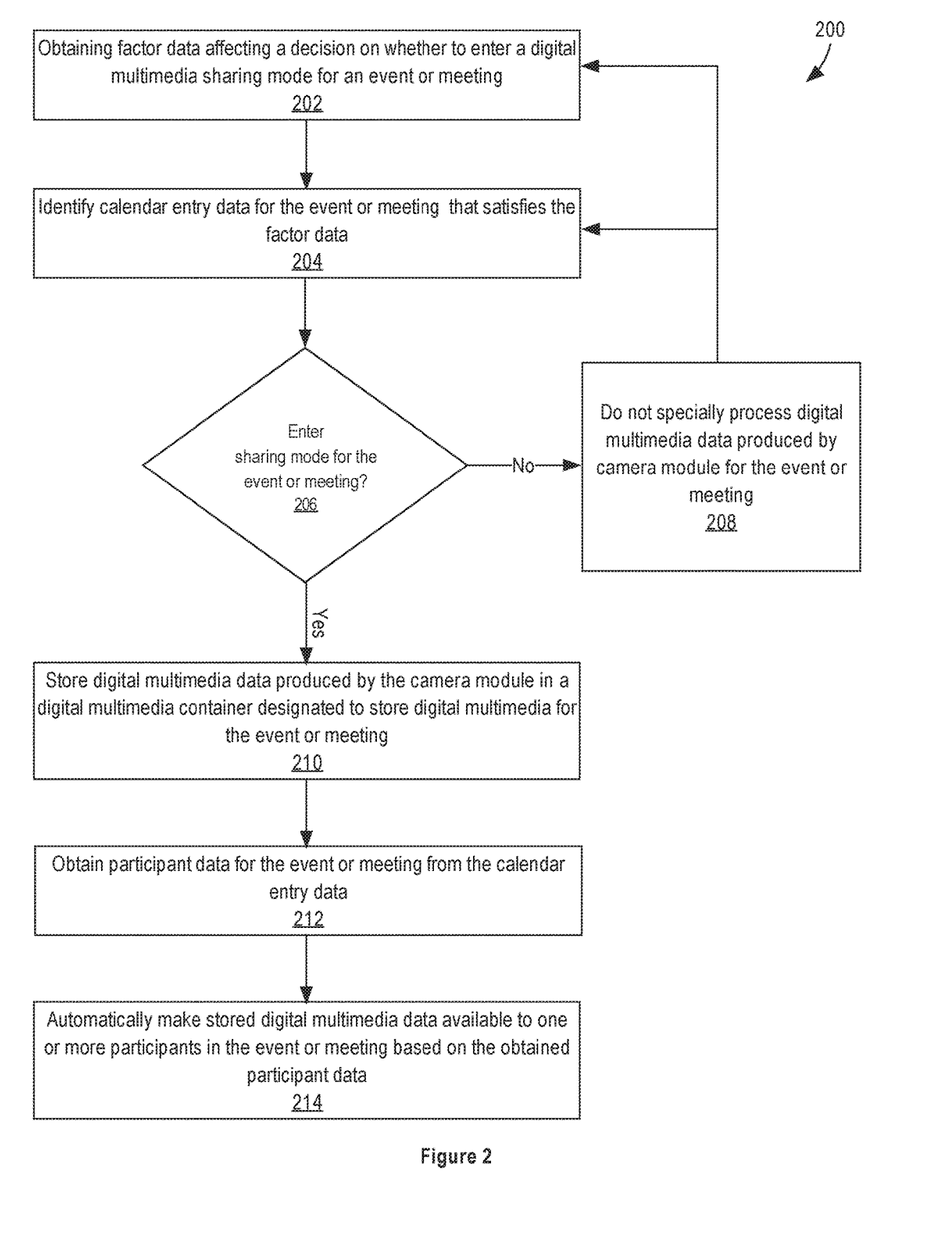
FIG. 2 is a flow diagram of a process for automatic sharing of digital multimedia in accordance with some embodiments of the present technology.

FIG. 2 is a flow diagram of a process 200 for automatic sharing of digital multimedia accordance with some embodiments of the present technology. In some embodiments, process 200 is performed by a digital multimedia sharing module executing on a camera-equipped computing device with or operative coupled to a camera module. For example, process 200 may be performed by sharing module 136 stored in memory 102 and executing on device 100. Further, while steps of process 200 are shown in a certain order in the flow diagram, the steps may be performed in a different order than shown or performed concurrently with one another where the result of one step is not used as input to another step or where steps are otherwise independent of each other with respect to order of performance. In other cases, entire steps or portions of steps may be omitted entirely. Still further, steps other than those shown may be performed as part of process 200.

Mode Entering Factors

At block 202, one or more digital multimedia sharing mode entering factors affecting a decision on whether or not to enter a digital multimedia sharing mode for an event or meeting are determined. In general, the factors may be used to determine, based on calendar entry data for the event or meeting, whether the event or meeting is currently taking place or is about to take place, whether the camera-equipped computing device is at or near the event location or meeting location, and whether the user of the camera-equipped computing device is an attendee at the event or meeting. Determining a factor can involve the camera-equipped computing device obtaining data (sometimes referred to herein as "factor data") representing a circumstance, fact, or influence that contributes to the decision to enter or not enter a digital multimedia sharing mode for the event or meeting. Obtaining factor data can include the camera-equipped computing device determining or detecting the factor data.

One example of possible factor data is current date and time data that may be used to determine, based on the calendar entry data for the event or meeting, whether the event or meeting is currently taking place or is about to take place. In some embodiments, the current date and time data is obtained or determined from the operating system of the camera-equipped computing device. For example, the operating system may offer a system call interface that the sharing module can invoke or call to obtain or determine the current date and time data. In another embodiments, the current date and time data is determined from a network accessible time service or other network service or server capable of providing the current date and time data in response to a network request. In some embodiments, the current date and time data indicates all of the following information, or a subset or superset thereof:

a calendar month, day, and year;

an hour of the day and minutes of the hour; and a timezone the date and time are relative to.

Another example of possible factor data is current physical location data that may be used to determine, based on the calendar entry data for the event or meeting, whether the camera-equipped computing device is at or near the event location or meeting location. In some embodiments, current physical location data is obtained or determined from a physical location module of the camera-equipped computing device such as, for example, a GPS module. In some embodiments, the physical location data indicates the following information about the physical location of the camera-equipped computing device, or a subset or superset thereof:

GPS coordinates such as a latitude and a longitude of the camera-equipped computing device according to a reference coordinate system such as, for example, the Universal Transverse Mercator (UTM), the Universal Polar Stereographic (UPS), or the Military Grid Reference System) (MGRS) reference coordinate system;

a radius value that, in combination with GPS coordinates, defines a circular geo-fence or geo-perimeter; and/or     an address such as a street address or other textual description of the physical location of the camera-equipped computing device.

Yet another example of possible factor data is nearby user/device data that may be used to determine, based on the calendar entry data for the event or meeting, whether the user of the camera-equipped computing device is an attendee at the event or meeting. In particular, if the devices of other users that are also participants in the event or meeting, according to the calendar entry data, are nearby the camera-equipped computing device of the user, then it may be determined that there is a greater probability than otherwise that the user of the camera-equipped computing device is an attendee at the event or meeting based on the assumption that the participants will be near each other just before, during, just after the time of the event or meeting.

In some embodiments, nearby devices are detected through interaction with an online or network location service whereby devices periodically communicate physical location information to the location service. From this communicated information, the location service can determine devices that are near each other. A device, such as the camera-equipped computing device, that communications physical location information to the location service can query the service to determine other devices that are physically near the querying device (e.g., within a specified distance). The physical location information communicated by the devices to the location service can be any information that the location service can use to determine the physical locations of the devices. For example, the communicated physical location information may be GPS coordinates. Alternatively, the location service may determine the physical location of a device using the service through a triangulation technique such as one used by a Wi-Fi positioning system. The location service may also provide the identities of the current logged on users of the nearby device in response to the query, if such identify information has been authorized to be shared by the logged on users.

In some embodiments, nearby devices are detected without use of an intermediate online service or server. For example, nearby devices can detect one another through an exchange of information using a short-range radio frequency (RF) technology such as Bluetooth. In this case, the nearby devices may not detect their own physical location.

Factor data may be obtained by the camera-equipped computing device at a variety of different times. In general, factor data may be obtained anytime a decision is needed on whether or not to enter a digital multimedia sharing mode for an event or meeting. In some embodiments, factor data is obtained at all of the following times, or a subset or superset thereof:

Upon or soon after an application for capturing digital multimedia using the camera module is launch or started by a user;

Upon or in response to receiving an alert or an alarm indicating a current or upcoming event or meeting; and/or On a periodic or polling basis such as on a regular, irregular, or periodical interval of time.

The obtained factor data is not limited to any particular type of factor data or limited to the types of factor data described above. For example, factor data may indicate whether the camera-equipped computing device has recently changed location determined either by a positioning system (e.g., a GPS system) or through a device sensor (e.g., an accelerometer or altimeter) that detects device motion. The recent change in location can be indicative of the user of the camera-equipped computing device carrying the device into the conference room or area whether the event or meeting is taking place. As another example, factor data obtained from an RF beacon (e.g., a wireless access point) in a conference room or in a particular area can indicate that the camera-equipped computing device has entered the conference room or area.

Entering the Sharing Mode

At block 204, calendar entry data for the event or meeting that "satisfies" the factor data is identified. Calendar entry data for the event or meeting may be considered to satisfy the factor data if the calendar entry data matches or substantially matches the factor data for a particular mode entering factor, a particular combination of mode entering factors, or a threshold number of mode entering factors. Calendar entry data may be considered to substantially match the factor data for a mode entering factor if the calendar entry data is within a threshold amount of the factor data. For example, calendar entry data specifying that the event or meeting is scheduled to start at 11:00 AM on a particular day may be considered to substantially match current date and time data specifying a time of 10:52 AM on the particular day because the current date and time is within 10 minutes of the scheduled start time. Similarly, calendar entry data specifying that that the event or meeting is to take place at a particular event or meeting location may be considered to substantially match current physical location data indicating a physical location within 100 feet of the particular event or meeting location.

In some embodiments, calendar entry data for an event or meeting is considered to satisfy the factor data if one, some, or all of the following conditions are met:

the current date and time data of the factor data indicates a current date and time that is within a threshold amount of time of the starting time of the event or meeting (e.g., 15 minutes) as indicated by the calendar entry data, during the event or meeting as indicated by the calendar entry data, or within a threshold amount of time of the ending time of the event or meeting as indicated by the calendar entry data;

the current physical location data of the factor data indicates a current physical location of the camera-equipped computing device that is at or within a threshold amount of distance (e.g., 100 feet) of the event location or meeting as indicated by the calendar entry data; for this, the calendar entry data may include GPS coordinates or geo-fence information which can be compared to GPS coordinates or geo-fence information of the current physical location data for the camera-equipped computing device; alternatively, a postal address or other textual physical location information of the calendar entry data may be translated to GPS coordinates or geo-fence information using a geo-coding network service before the comparison; as yet another alternative; a postal address or other textual physical location information of the calendar entry data may be compared or pattern-matched to a postal address or textual physical location information of the current physical location data; and/or the nearby user/device data of the factor data indicates that the user and/or the camera-equipped computing device of the user is physically near the computing devices of a threshold number (e.g., one) of other participants in the event or meeting as identified in the calendar entry data.

The calendar entry data may be identified by querying a calendar database. For example, the calendar database may be queried for calendar entries that match or that otherwise might satisfy the factor data. If multiple such calendar entries are identified, then a best matching calendar entry may be identified as the one to enter or possibly enter a digital multimedia sharing mode for. For example, calendar entry data for two overlapping meetings, one that is about to end and one that has just started, may be returned in response to the query. The calendar entry data for one of the two meetings may be identified in favor of the other. For example, calendar entry data for the meeting that just started may be identified in favor of the calendar entry data for the meeting that is about to end, or vice versa. Alternatively, the user of the camera-equipped computing device may be prompted through a graphical user interface which of the multiple calendar entries a digital multimedia sharing mode should be entered for.

In some embodiments, if multiple possibly conflicting calendar entries satisfy the factor data submitted in the query to the calendar database, one of the calendar entries can be selected based on a heuristic that takes into account the proximity of attendees to the event or meeting locations of the multiple calendar entries. For example, the calendar entry with the event location or meeting location that the camera-equipped computing device is physically closest to can be selected.

Calendar entry data may also be identified in response to receiving an alert or an alarm. For example, the sharing module may register with the calendar module to receive a reminder alert or alarm a specified amount of time (e.g., 5, 10, 15, 20, or 30 minutes) before an event or meeting is scheduled to start according to calendar entry data. The alert or alarm may be associated with a message containing calendar enter data or data for obtaining the calendar entry data from a calendar database.

In response to receiving the alert or alarm, a digital multimedia sharing mode for the event or meeting can be entered automatically at the scheduled start time of the event or meeting or automatically entered at a predetermined amount of time (e.g., 5 minutes) before the event or meeting is scheduled to start. In some embodiments, the user of the camera-equipped computing device is prompted by the sharing module through a graphical user interface presented on a display of the device to confirm entrance into the digital multimedia sharing mode for the event or meeting. Such prompting can occur at the scheduled start time of the event or meeting or at a predetermined amount of time (e.g., 5 minutes) before the event or meeting is scheduled to start.

In the case a reminder alert or alarm is received for an event or meeting, factor data may or may not be obtained as in step 202. That is, a decision to enter a digital multimedia sharing mode for an event or meeting may be made based on calendar entry data obtained for an event or meeting and not based on factor data. However, even in the case a reminder alert or alarm is received for an event or meeting, factor data may be obtained to corroborate the decision to enter a digital multimedia sharing mode for an event or meeting. For example, the sharing module may perform the following sequence of events:

1. At time X, the sharing module receives an alert or alarm for an event or meeting that is scheduled to start in Y minutes from now (Time X) at time Z>X.
2. At or very near time Z, the sharing module obtains current physical location factor data and compares it to location data for the calendar entry representing the event or meeting to corroborate the decision to enter a digital multimedia sharing mode for the event or meeting.

At block 206, a decision is made whether to enter a digital multimedia sharing mode the event or meeting. As discussed above, this decision can be based on factor data obtained at block 202 and calendar entry data identified at block 204. Alternatively, this decision can be based on calendar entry data identified at block 204 and not based on factor data obtained at block 202, in which case the operations of block 202 need not be performed. Also as discussed above, in the case where the decision is based on both factor data and calendar entry data, the decision to enter a digital multimedia sharing mode for the event or meeting can be made based on how many mode entering factor satisfy, match, or substantially match the calendar entry data or based on a particular mode entering factor or particular combination of mode entering factors satisfying, matching, or substantially matching the calendar entry data. Where the decision is based on calendar entry data and not on factor data, the decision can be made at or after an alert or alarm is received about an upcoming event or meeting start time. In this case, a timer can be set to automatically enter a digital multimedia sharing mode at or just before or just after the scheduled start time of the event or meeting as indicated by the calendar entry data. The set timer can be removed if a subsequent alarm or alert is received indicated that the event or meeting has been canceled. In one alternative, when a timer is set to enter a digital multimedia sharing mode for the event or meeting based on a scheduled start time indicated by calendar entry data, when the timer is trigged, factor data is obtained as in block 202 to corroborate or refute the decision to enter the digital multimedia sharing mode.

If a decision is made to enter a digital multimedia sharing mode for the event or meeting, then the process 200 proceeds to block 210 discussed below. Otherwise, the process proceeds to block 208 where digital multimedia produced by the camera module of the camera-equipped computing device while not in the digital multimedia sharing mode is not specially processed for the event or meeting represented by the calendar entry data identified at block 204. The process 200 may then start again at some later time at block 202 or block 204.

Segregating Digital Multimedia Produced by the Camera Module

If the decision at block 206 was to enter a digital multimedia sharing mode for the event or meeting represented by the calendar entry data identified at block 204, then any digital multimedia produced by the camera module of the camera-equipped computing device is stored in a digital multimedia container designated to store digital multimedia for the event or meeting. In this way, digital multimedia produced by the camera module while in the digital multimedia sharing mode for the event or meeting can be segregated at the camera-equipped computing device from other digital multimedia produced by the camera module while not in the digital multimedia sharing mode for the event or meeting.

The designated digital multimedia container can be a folder in an operating system file system. Alternatively, the designated digital multimedia container can be a compressed file archive file in an operating system file system such as a ZIP file archive. More generally the designated digital multimedia container can be any type of data container suitable for storing digital multimedia data. For example, the designated digital multimedia container can be a logical data container (e.g., a table, a row, a column, an object) in a database (e.g., a relational database, an object database, a flat-file database).

The designated digital multimedia container can be created specially to store digital multimedia for the event or meeting. When creating the digital multimedia container, the container may be given a name that indicates the event or meeting it is designated to store digital multimedia for. For example, the name may be based on tile or description information about the event or meeting from the calendar entry data. As an alternative to creating a new digital multimedia container, an existing digital multimedia container can be designated to store digital multimedia for the event or meeting. For example, if the calendar entry data indicates that the event or meeting is a recurring one and that the current occurrence is the second or subsequent occurrence of the event or meeting, then an existing digital multimedia container created for the first occurrence of the event or meeting may be designated to store digital multimedia produced by the camera module for the second and subsequent occurrences of the event or meeting. In this way, a single digital multimedia container can be designated to store all digital multimedia produced for all occurrences of the event or meeting.

Storing digital multimedia produced by the camera module in the container designated to store digital multimedia for the event or meeting can include identifying digital multimedia produced by the camera module while in the digital multimedia sharing mode for the event or meeting as pertaining to the event or meeting. Such identification can occur in at least three different ways, which are not mutually exclusive of each other.

In a first way, the sharing module registers with the camera module to be notified when the camera module captures digital multimedia (e.g., digital photograph data). The sharing module can then identify all digital multimedia for which it receives notification from the camera module while in the digital multimedia sharing mode for the event or meeting as digital multimedia pertaining to the event or meeting. All such identified digital multimedia can then be stored in the designated container.

In a second way, the sharing module configures the camera module to store all digital multimedia in the designated container. For example, when the sharing module enters the digital multimedia sharing mode for the event or meeting, the sharing module configures the camera module with the designated container such that the camera module stores all subsequent digital multimedia data it produces in the designated container. Such configuration may be accomplished by the sharing module using an application programming interface offered by the camera module, for example. When the sharing module leaves the sharing mode, the sharing module can then configure the camera module again to no longer store captured digital multimedia data in the designated container. In this way, only digital multimedia produced by the camera module while the sharing module is in the sharing mode is stored in the designated container.

In a third way, the sharing module examines the embedded metadata of digital multimedia produced by the camera module for digital multimedia having a captured data and time that is on or after the sharing module enters the sharing mode for the event or meeting and on or before the sharing module exist the sharing mode for the event or meeting. All such digital multimedia data can be moved by the sharing module from the default location where the camera module stores captured digital multimedia data into the designated container. The embedded metadata can be, for example, exchangeable image file format (Exif) data inserted by the camera module into the digital multimedia data it produces.

Sharing Digital Multimedia with Event or Meeting Participants

At block 212, participant data for the event or meeting is obtained from the calendar entry data identified at block 204. This step may be performed any time after step 204 including, for example, before steps 206, 210, and/or 212. At a minimum, the obtained participant data indicate one or more participants in the event or meeting. Such indication may be made in a number of different ways. In one way, a participant in an event or meeting is indicated by the participant's name, the participant's title, the participant's company, business, organization, or affiliation, the participant's e-mail address, the participant's phone number, and/or other information that uniquely identifies the participant among the participants in the event or meeting. Information identifying a participant obtained from the calendar entry data may be used to identifying other information identifying the participant. For example, an e-mail address obtained from calendar entry data may be used to lookup other identifiers associated with that e-mail address including, for example, other e-mail address, phone numbers, user identifiers. Such lookup may be made in another database at the camera-equipped computing device such as a contacts database or by submitting a network request to a network service.

At block 214, the digital multimedia data stored at block 210 is automatically made available to one or more participants in the event or meeting based on the participant data obtained at block 212. The digital multimedia data can be automatically made available to all participants in the event or meeting or just a subset of them. For example, the digital multimedia data can be made available to all participants, to all participants except the organizer of the event or meeting, to all participants except the participant that is the user of the camera-equipped computing device, to all attending participants, to all attending participants except the organizer of the event or meeting, or to all attending participants except the participant that is the user of the camera-equipped computing device. Whether a participant is an attending participant can be determined from the participant data which may indicate whether the participant accepted an invitation to the event or meeting from the organizer (i.e., is an attending participant) or whether the participant declined the invitation (i.e., is not an attending participant).

While in some embodiments, the digital multimedia data is made available only to participants in the event or meeting, the digital multimedia data is made available to other persons in other embodiments in addition to or instead of participants in the event or meeting. For example, the digital multimedia data can be made available to a team manager or supervisor.

The digital multimedia data can be automatically made available as or soon after the digital multimedia data is stored at block 210. Thus, participants in the event or meeting may have access to the digital multimedia data during the event or meeting. Alternatively, the digital multimedia data can be automatically made available after exiting the digital multimedia sharing mode for the event or meeting. When the digital multimedia data is automatically made available may be according to user preference or configuration information associated with the sharing module.

The digital multimedia data can be automatically made available in a number of different ways. In one way, the sharing module uses an e-mail account of the user of the camera-equipped computing device to send the digital multimedia data to the participant(s) as one or more attachments to one or more e-mail messages. For example, the user may configure the sharing module to use a GMAIL, YAHOO!, or other Simple Mail Transfer Protocol (SMTP) enabled e-mail account of the user to send the e-mail messages. In another way, the sharing module uses a Simple Message Service (SMS) or a Multimedia Messaging Service (MMS) account of the user to send the digital multimedia data to the participant(s) as one or more attachment(s) to one or more text messages. More generally, the digital multimedia data can be automatically made available in any way that provides a participant electronic access to the digital multimedia data. For example, the digital multimedia data can be uploaded to a web server where it can access by a participant using a web browser. As another example, the digital multimedia data can be sent to participants via a protocol in the Internet protocol suite such as the HyperText Transfer Protocol (HTTP), the Transmission Control Protocol over Internet Protocol (TCP/IP), or the Simple Mail Transfer Protocol (SMTP). As yet another example, the digital multimedia data can be made available to participants through an application executed on the camera-equipped computing device.

Sharing through Content Item Management Service

In one embodiment, the digital multimedia data is automatically shared at block 213 with participant(s) through a content item management server. The digital multimedia data can be shared through the content item management server in at least two different ways, which are not mutually exclusive of each other even with respect to same participant.

In a first way, the digital multimedia data is uploaded by the camera-equipped computing device to the content item management server where it is stored in a server-side container. The server-side container may be a folder or a named collection of data blocks maintained and managed by the server. The camera-equipped computing device then makes a network request of the server to generate a link to the server-side container via an network accessible application programming interface (API) offered by the server. In one embodiment, the link is in the form of a Uniform Resource Locator (URL) that can be shared with the participants, for example, in an e-mail or text message. In response to receiving the network request to generate the link, the server generates a unique link to the server-side container and sends it to the camera-equipped computing device in response to the request. In one embodiment, the link is generated by the server in a manner consistent with the techniques described in related U.S. patent application Ser. No. 13/217,944, entitled "File Sharing via Link Generation", filed Aug. 25, 2011, the entire contents of which is hereby incorporated by reference. Upon receiving the unique link, the camera-equipped computing can automatically make the digital multimedia data uploaded to the server available to the participants by making the unique link available to the participants, for example, by sending the unique link to the participant(s) in one or more e-mail message and/or one or more text messages. The participant(s) may use the unique link to download the digital multimedia data from the server and/or access the digital media multimedia data at the server. For example, the participant(s) may submit the unique link to the server through a web browser and the server in response to receiving the unique link may return web pages that allow the participants to view the digital multimedia data in the web browser and/or download the digital multimedia data from the server.

While in some embodiments, the unique link is sent to participants after the digital multimedia data has been uploaded to the server, the unique link is sent to participants before or during uploading the digital multimedia data to the server. In these other embodiments, the unique link may be sent any time after the server-side container has been created and before all of the digital multimedia data has been uploaded. If all of the digital multimedia data has yet to be uploaded to the server when a participant submits the unique link to the server, the unique link may be used to access and/or download the digital multimedia data that has been uploaded and stored in the server-side container so far.

While in some embodiments, a unique link such as a unique URL is sent to participants, a unique identifier of the server-side container is sent to participants in other embodiments. The participants receiving the unique identifier may submit the unique identifier to the server, for example through a web interface or through an application, to access and/or download the uploaded digital multimedia data.

In a second way, the digital multimedia data is uploaded by the camera-equipped computing device to the content item management server where it is stored in a server-side container, similar to the first way. However, instead of sharing the uploaded digital multimedia data with the participants via a unique link, the server-side container in which the digital multimedia data is stored on the server-side is shared with the participant(s). To do this, the camera-equipped computing device may send a network request to the server to share the server-side container with identified participant(s). To accomplish this, it may be required that the user of the camera-equipped computing device and the identified participant(s) have accounts with the server so that the identified participant(s) can be authenticated by the server. While is some embodiments the user and identified participant(s) have accounts with the server, the user and/or identifier participants(s) do not have accounts with the server in other embodiments. In these other embodiments, sharing of the server-side container can be accomplished so long as the user and/or identified participant(s) have a verifiable identity such as, for example, a variable phone number or e-mail address. Sharing the server-side container in which the digital multimedia data is stored with the identified participant(s) can cause a synchronization application on the devices of the identified participant(s) to download the server-side container and its contents including the digital multimedia data to the devices.

Figure 3:
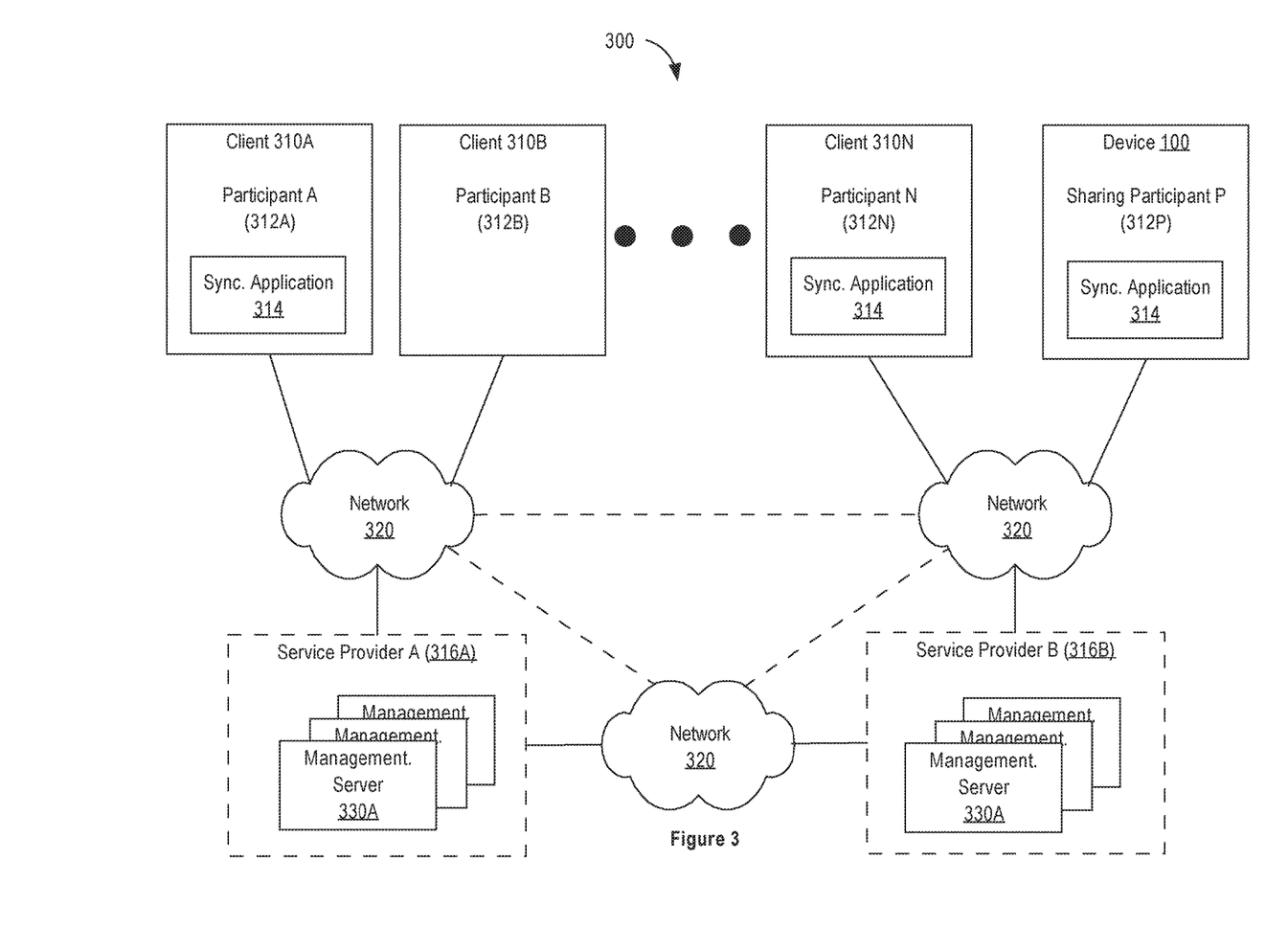
FIG. 3 is a block diagram of a distributed computing environment in which automatic sharing of digital multimedia through a content item management server can occur in accordance with some embodiments of the present technology.

Turning now to FIG. 3, it is a block diagram illustrating an exemplary distributed computer system 300 for automatically sharing digital multimedia data via a content item management server according to certain embodiments of the invention. Computer system 300 includes a plurality of clients 310. Users of clients 310 (also herein called client devices or client systems) are participants 312 in an event or meeting. One of the participants, sharing participant 312P, is a user of camera-equipped computing device 100. The other participants 312A, 312B, . . . 312N use a client device 310. Client devices 310 can be one of a number of different types of computing devices including, but not limited to, an Internet kiosk, a personal digital assistant, a cell phone, a gaming device, a desktop computer, a laptop computer, a handheld computer, or a tablet computer. Client devices 310 and camera-equipped device 100 are coupled to network 320, which can be any of a number of networks (e.g., Internet, intranet, local area network, wide area network, wireless network, wired network, optical network, or a combination of such networks). More generally, clients 310 and camera-equipped device 100 and content item management servers 330 are coupled to each other via one or more communication networks 320.

At least camera-equipped computing device 100 but optionally also one or more client devices 310 executes a synchronization application 314. The synchronization application 314 on the camera-equipped computing device 100 is at least configured to upload the digital multimedia data to be shared to a respective management server 330. The synchronization application 314 on other client devices 310 is at least configured to download the digital multimedia data from a respective management server 330.

While system 300 may have a single content item management server 330, in other embodiments system 300 has multiple content item management servers 330. For example, multiple content item management servers 330A and 330B may be hosted by different service providers, such as providers 316A and 316B respectively. In some embodiments, the providers are internet service providers (ISPs) providing a content item management service. Alternatively, some or all of the providers may be dedicated content item management service providers. When system 300 includes multiple management servers 330, the management servers 330 may be coupled together directly, or by a local area network (LAN), or via network 320, or by another type of network.

Management server(s) 330 may offer a network-accessible interface for requesting generation of a unique link for digital multimedia data uploaded to a management server 330. For example, after synchronization application 314 on camera-equipped computing device 100 uploads the digital multimedia data to a management server 330, the sharing module may send a network request to the network-accessible interface of a management server 330 to generate a unique link for the uploaded digital multimedia data. In response to receiving the request, the management server 330 may generate the unique link and send it to the sharing module of the camera-equipped computing device 100. Upon receiving the generated unique link, the sharing module can share it with one or more other participants 312A, 312B, . . . 312N in the event or meeting by sending the unique link to the other participants 312A, 312B, . . . 312N in one or more e-mail messages, one or more text messages, or otherwise automatically making the unique link available to one the other participants 312A, 312B, . . . 312N. The other participants 312A, 312B, . . . 312N may use the unique link to download the digital multimedia data from a respective management server 330 and/or access the digital media multimedia data at a respective management server 330. For example, a participant 312 may submit the unique link to a respective management server 330 through a web browser application executing on a respective client device 310. The respective management server 330 server, in response to receiving the unique link, may return web pages that allow the participant 312 to view the digital multimedia data in the web browser and/or download the digital multimedia data to the respective client device 310 from a management server 330.

Management server(s) 330 may also offer a network-accessible interface for requesting that the server-side container where the uploaded digital multimedia data is stored be shared with other participants 312. For this, it may be required that the other participants 312 with which the server-side container is shared have accounts with the content item management service and have the synchronization application 314 installed on their respective client devices 310. In this example, participant 312B does not have an account with the content item management service and does not have the synchronization application 314 installed on respective client device 310B. Despite this, the digital multimedia data may still be shared with participant 312B through the content item management service via a unique link as described previously. When a management server 330 receives a request from the camera-equipped computing device 100 to share the server-side container with other designated participants, such as for example participant 312A, a management server 330 signals the synchronization application 314 on the participant's client device 310 to download the server-side container including the contained uploaded digital multimedia data to the participant's client device 310. In this way, digital multimedia data uploaded by the camera-equipped computing device 100 to a management server 330 can be automatically shared with other participants 312 that also have accounts with the content item management service.

Extensions and Alternatives

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable other skilled in the art to best utilize the invention and various embodiments with various modifications as are suited to the requirements of the particular implementation at hand or the particular use contemplated.

The invention claimed is:

1. A computer-implemented method comprising:
   obtaining, by a computing device, factor data affecting a decision on whether or not to enter a digital multimedia sharing mode for an event or meeting, the event or meeting involving one or more participants;
   wherein the factor data includes information on at least one of:
      a physical location of the computing device,
      a current time, or
      a computing device of a participant, of the one or more participants, that is nearby the computing device;
   the computing device:
      entering the digital multimedia sharing mode at the computing device, based at least in part on the factor data;
      identifying digital multimedia data that is captured by the computing device while the computing device is in the digital multimedia sharing mode;
      making the digital multimedia data available to the one or more participants; and
   wherein making the digital multimedia data available to the one or more participants comprises the computing device that captured the digital multimedia data while in the digital multimedia sharing mode for the event or meeting performing:
      (a) programmatically requesting a content management system to create, at the content management system, a server-side container, for the event or meeting, that is configured for synchronization with a client-side container at a client device of at least one participant of the one or more participants, and
      (b) uploading the digital multimedia data to the server-side container at the content management system thereby causing the digital multimedia data to be sent to the client device of the at least one participant by manner of synchronization between the server-side container at the content management system created for the event or meeting and the client-side container at the client device of the at least one participant of the one or more participants.

2. The method of claim 1, further comprising:
   obtaining calendar entry data for the event or meeting; and
   obtaining participant data for the event or meeting from the calendar entry data, the participant data indicating the one or more participants.

3. The method of claim 1, further comprising:
   obtaining calendar entry data for the event or meeting by performing at least one of:
      receiving notification for the event or meeting from a calendar database, or
      querying the calendar database for the event or meeting;
   determining that the calendar entry data satisfies the factor data; and
   entering the digital multimedia sharing mode at the computing device, based at least in part on determining the calendar entry data for the event or meeting satisfies the factor data.

4. The method of claim 1, wherein the factor data indicates a current location of the computing device and wherein the method further comprises entering the digital multimedia sharing mode at the computing device, based at least in part on determining that the current location of the computing device specified in the factor data is within a threshold distance from a location of the event or meeting specified in calendar entry data for the event or meeting.

5. The method of claim 1, wherein the factor data indicates a current date and time and wherein the method further comprises entering the digital multimedia sharing mode at the computing device, based at least in part on determining that the current date and time is between a start time and an end time of the event or meeting specified in calendar entry data for the event or meeting.

6. The method of claim 1, further comprising:
causing download of the digital multimedia data to the client-side container at the client device of the at least one participant of the one or more participants.

7. The method of claim 1, further comprising:
requesting to share the server-side container with the at least one participant of the one or more participants, wherein the at least one participant has an account with the content management system;
in response to requesting to share the server-side container, causing download of the digital multimedia data to the client-side container at the client device of the at least one participant of the one or more participants.

8. The method of claim 1, further comprising:
requesting to share the server-side container with the at least one participant of the one or more participants by identifying an e-mail address associated with the at least one participant, the at least one participant having no account with the content management system at a time of the request.

9. The method of claim 1, wherein the server-side container is a folder or a named collection of data blocks maintained and managed by the content management system.

10. A computer-implemented method comprising:
obtaining, by a computing device, factor data affecting a decision on whether or not to enter a digital multimedia sharing mode for an event or meeting, the event or meeting involving one or more participants;
wherein the factor data is obtained in response to detecting occurrence of at least one of the following events:
a launch of multimedia capturing application on the computing device,
a start of the event or meeting, or
generation of an alert or alarm indicating that the event or meeting is about to start;
the computing device:
entering the digital multimedia sharing mode at the computing device based at least in part on the factor data;
identifying digital multimedia data that is captured by the computing device while the computing device is in the digital multimedia sharing mode;
making the digital multimedia data available to the one or more participants; and
wherein making the digital multimedia data available to the one or more participants comprises the computing device that captured the digital multimedia data while in the digital multimedia sharing mode for the event or meeting performing:
(a) creating a client-side container at the computing device for the event or meeting that is configured for synchronization with a server-side container of a content management system,
(b) storing the digital multimedia data in the client-side container thereby causing, by manner of synchronization between the client-side container and the server-side container, the digital multimedia data to be sent to the content management system for storage in the server-side container,
(c) requesting the content management system to generate a unique shareable link to the server-side container,
(d) receiving the unique shareable link from the content management system, and
(e) sending the unique shareable link to at least one participant of the one or more participants.

11. The method of claim 10, further comprising:
obtaining calendar entry data for the event or meeting; and
obtaining participant data for the event or meeting from the calendar entry data, the participant data indicating the one or more participants.

12. The method of claim 10, further comprising:
obtaining calendar entry data for the event or meeting by performing at least one of:
receiving notification for the event or meeting from a calendar database, or
querying the calendar database for the event or meeting;
determining that the calendar entry data satisfies the factor data; and
entering the digital multimedia sharing mode at the computing device, based at least in part on determining the calendar entry data for the event or meeting satisfies the factor data.

13. The method of claim 10, wherein the factor data indicates a current location of the computing device and wherein the method further comprises entering the digital multimedia sharing mode at the computing device, based at least in part on determining that the current location of the computing device specified in the factor data is within a threshold distance from a location of the event or meeting specified in calendar entry data for the event or meeting.

14. The method of claim 10, wherein the factor data indicates a current date and time and wherein the method further comprises entering the digital multimedia sharing mode at the computing device, based at least in part on determining that the current date and time is between a start time and an end time of the event or meeting specified in calendar entry data for the event or meeting.

15. The method of claim 10, further comprising:
prior to requesting the content management system to generate the unique shareable link to the digital multimedia data, uploading the digital multimedia data to the server-side container of the content management system; and
wherein requesting the content management system to generate the unique shareable link to the digital multimedia data comprises requesting the content management system to generate the unique shareable link to the server-side container.

16. The method of claim 10, wherein requesting the content management system to generate the unique shareable link to the digital multimedia data comprises:
invoking a network-accessible application programming interface (API) of the content management system to generate the unique shareable link.

17. The method of claim 10, wherein requesting the content management system to generate the unique shareable link to the digital multimedia data causes sending the unique shareable link to a client device of at least one participant of the one or more participants.

18. The method of claim 10, further comprises:

during or after requesting the content management system to generate the unique shareable link to the digital multimedia data, uploading the digital multimedia data to the server-side container of the content management system; and wherein requesting the content management system to generate the unique shareable link to the digital multimedia data comprises requesting the content management system to generate the unique shareable link to the server-side container.

19. The method of claim 10, wherein the unique shareable link is a URL.

\* \* \* \* \*

UNITED STATES PATENT AND TRADEMARK OFFICE
CERTIFICATE OF CORRECTION

PATENT NO. : 10,205,758 B2
APPLICATION NO. : 15/138089
DATED : February 12, 2019
INVENTOR(S) : Joshua Kaplan Page 1 of 1

It is certified that error appears in the above-identified patent and that said Letters Patent is hereby corrected as shown below:

In the Claims

Column 22
Claim 1: Line 14 - After "a" and before "computing" insert --particular--.

Column 24
Claim 15: Lines 48-49 - Delete "digital mul-timedia data" and insert --server-side container--.
Lines 51-56 - Delete "; and wherein requesting the content management system to generate the unique shareable link to the digital mul-timedia data comprises requesting the content manage-ment system to generate the unique shareable link to the server-side container".

Claim 16: Line 59 - Delete "digital multimedia data" and insert --server-side container--.

Claim 17: Line 65 - Delete "digital multimedia data" and insert --server-side container--.

Column 25
Claim 18: Lines 3-4 - Delete "digital multimedia data" and insert --server-side container--.
Lines 6-11 - Delete "; and wherein requesting the content management system to generate the unique sharable link to the digital mul-timedia data comprises requesting the content manage-ment system to generate the unique shareable link to the server-side container".

Signed and Sealed this
Sixteenth Day of April, 2019

Andrei Iancu
*Director of the United States Patent and Trademark Office*